(No Model.) 5 Sheets—Sheet 2.
A. O. MACKIN.
ELECTRIC ARC LAMP.
No. 560,039. Patented May 12, 1896.
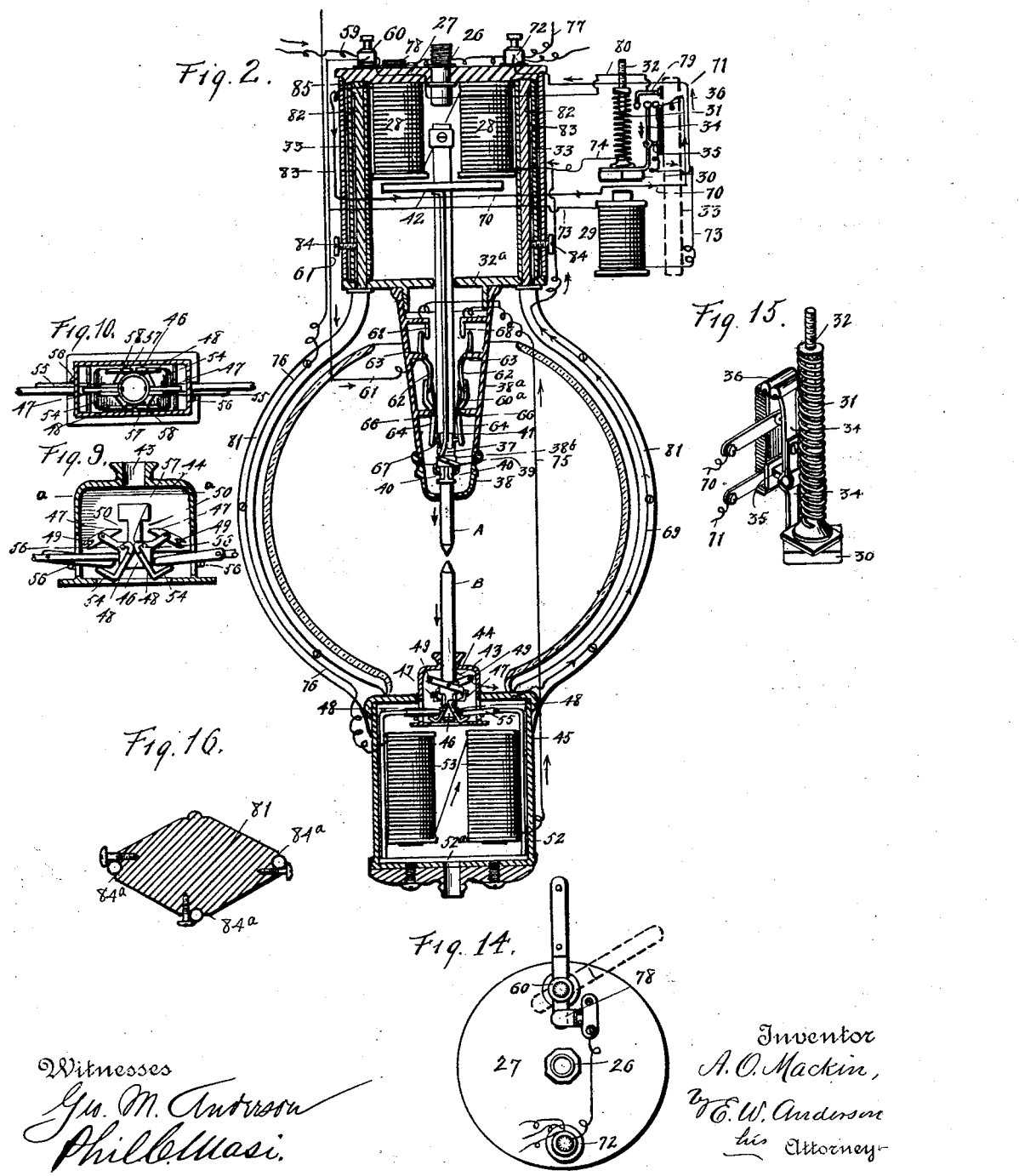
Witnesses
Geo. M. Anderson
Phil C. Masi
Inventor
A. O. Mackin,
by E. W. Anderson
his Attorney (No Model.) 5 Sheets—Sheet 3.
A. O. MACKIN.
ELECTRIC ARC LAMP.
No. 560,039. Patented May 12, 1896.
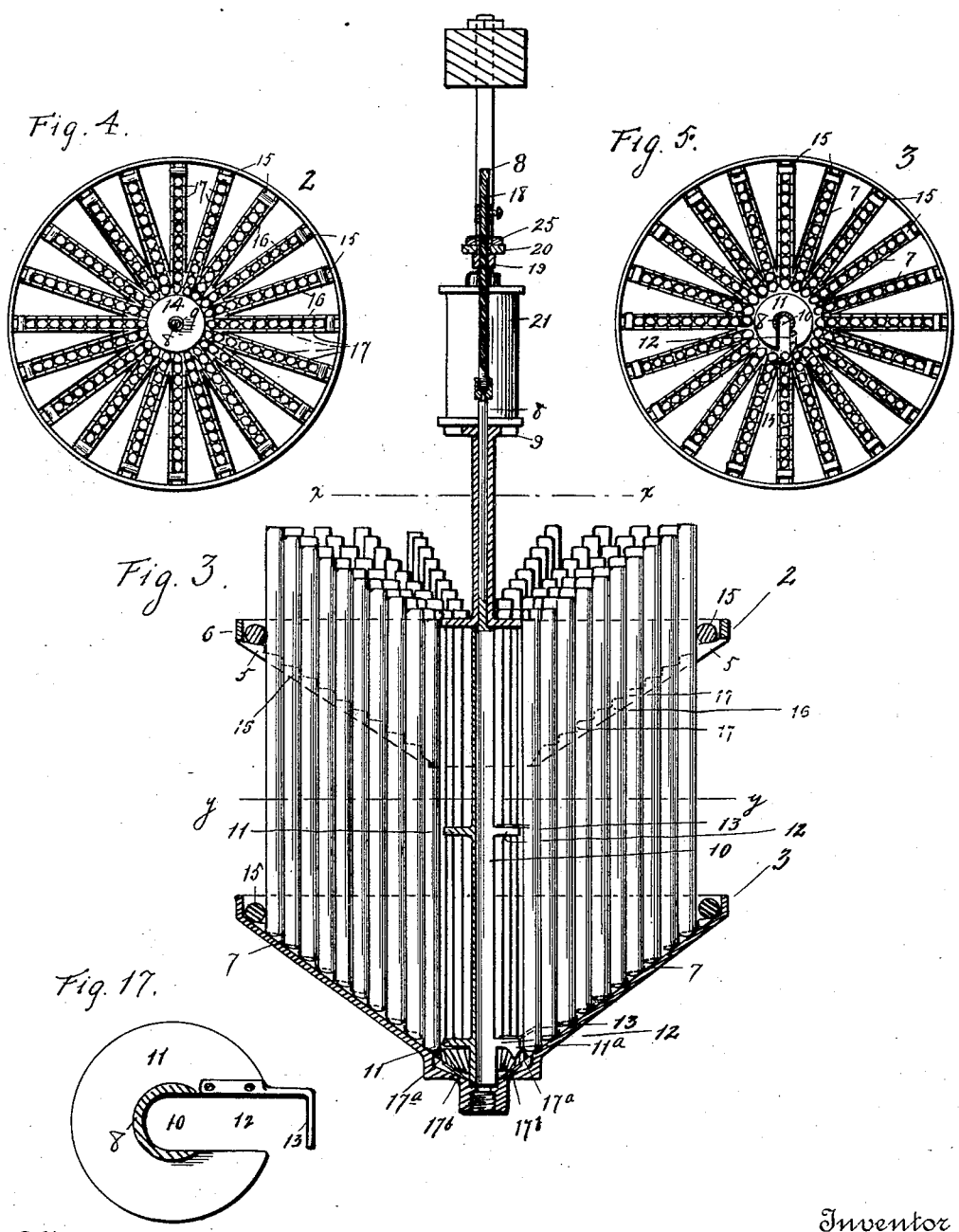

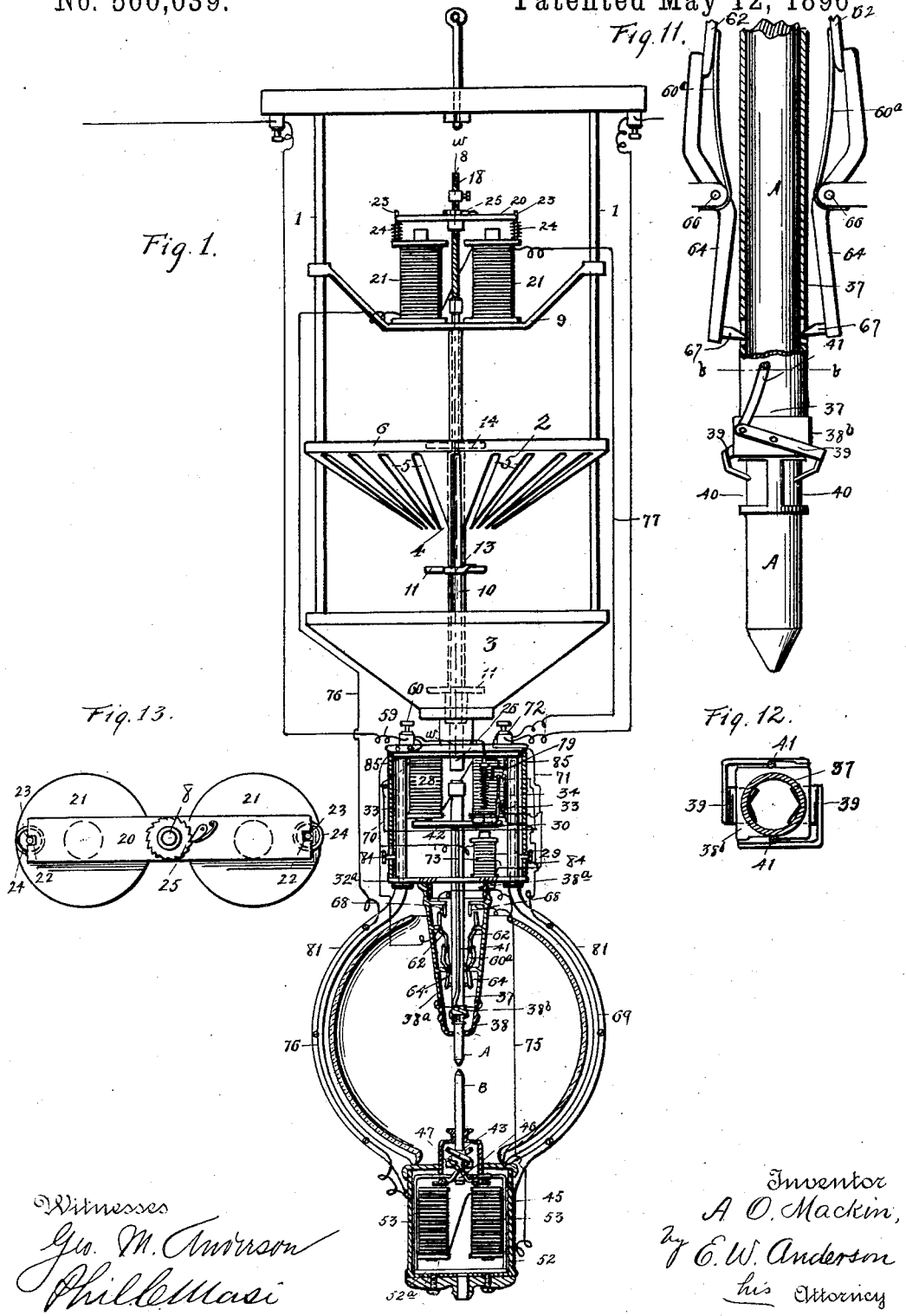

(No Model.) 5 Sheets—Sheet 4.

A. O. MACKIN.
ELECTRIC ARC LAMP.

No. 560,039. Patented May 12, 1896.

Witnesses
Geo. M. Anderson
Phil C. Masi.

Inventor
A. O. Mackin
E. W. Anderson
his Attorney (No Model.)  A. O. MACKIN.  5 Sheets—Sheet 5.
ELECTRIC ARC LAMP.

No. 560,039.  Patented May 12, 1896.

WITNESSES

INVENTOR
A. O. Mackin
by E. W. Anderson
his Attorney

UNITED STATES PATENT OFFICE.

ALVIE O. MACKIN, OF ANDERSON, INDIANA, ASSIGNOR OF ONE-HALF TO WARREN B. THOMAS, OF JOHNSTOWN, PENNSYLVANIA.

ELECTRIC-ARC LAMP.

SPECIFICATION forming part of Letters Patent No. 560,039, dated May 12, 1896.

Application filed October 3, 1895. Serial No. 564,562. (No model.)

*To all whom it may concern:*

Be it known that I, ALVIE O. MACKIN, a citizen of the United States, and a resident of Anderson, in the county of Madison and State of Indiana, have invented certain new and useful Improvements in Arc Electric Lamps; and I do declare the following to be a full, clear, and exact description of the invention, such as will enable others skilled in the art to which it appertains to make and use the same, reference being had to the accompanying drawings, and to letters and figures of reference marked thereon, which form a part of this specification, in which—

Figure 6:
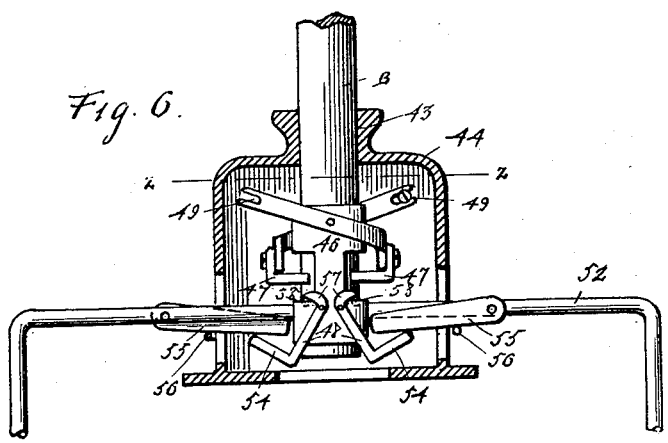
Figure 7:
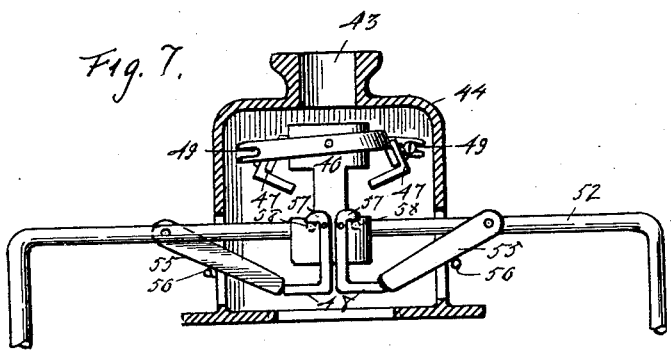
Figure 8:
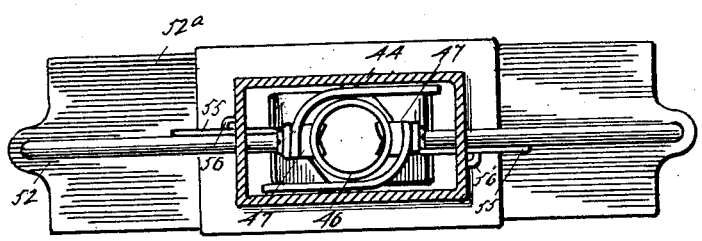
Figure 18:
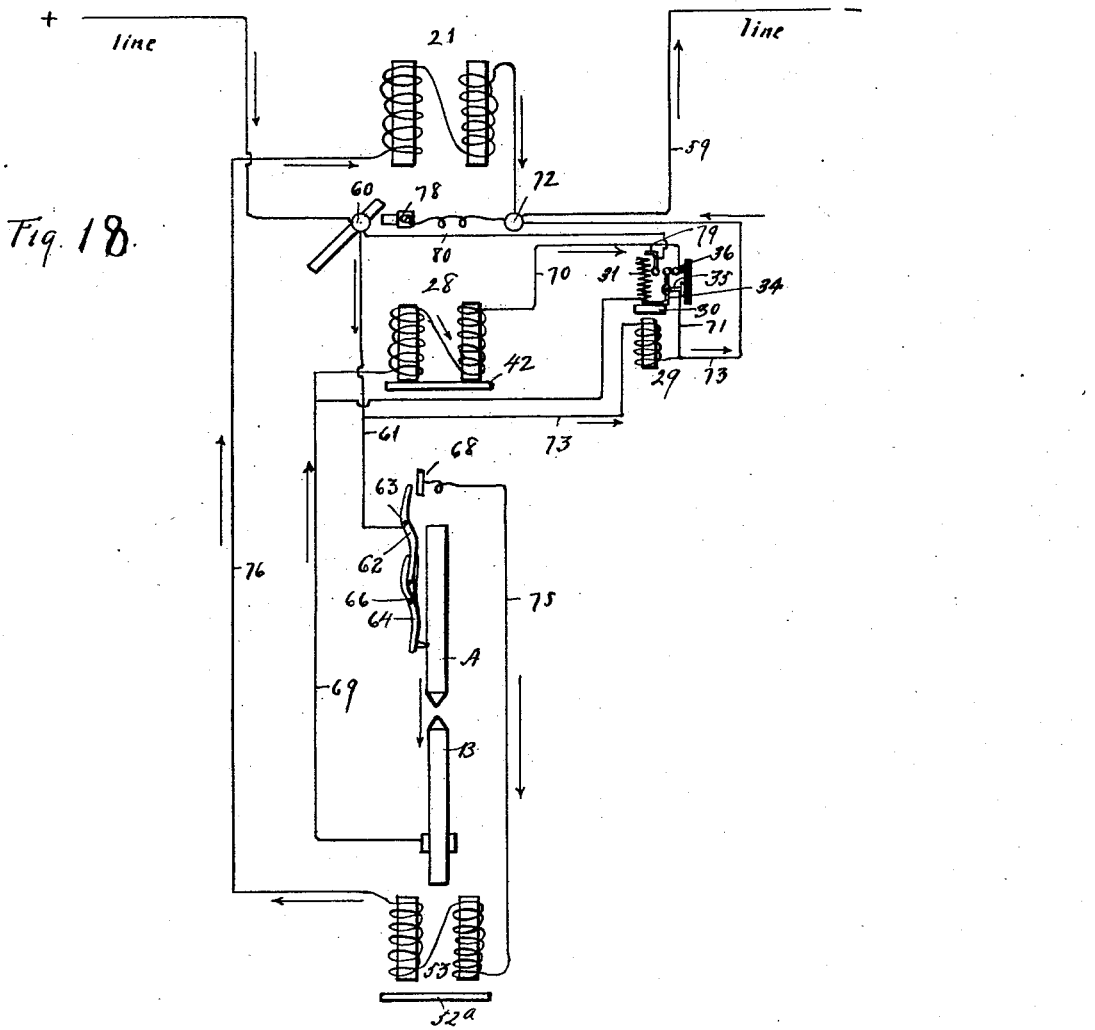

Figure 1 is a side elevation of lamp with casings, globe, and sleeve 38 in section and electric connections shown diagrammatically in part. Fig. 2 is an enlarged view of lower portion of Fig. 1 with posts 33 and extensions 82 in section, the magnet 29, its armature, lever 34, &c., being shown outside casing for better illustration. Fig. 3 is a section through upper part of Fig. 1 on line $w\,w$. Fig. 4 is a section on line $x\,x$, Fig. 3. Fig. 5 is a section on line $y\,y$, Fig. 3. Fig. 6 is a detail sectional view showing lower-carbon holder, carbon in position. Fig. 7 is a similar view with parts in position to receive new carbon. Fig. 8 is a section on line $z\,z$, Fig. 6. Fig. 9 is a detail sectional view showing modification of lower-carbon holder. Fig. 10 is a section on line $a\,a$, Fig. 9. Fig. 11 is a detail view of upper-carbon holder, lever 64, &c., tube 37 being in section. Fig. 12 is a section on line $b\,b$, Fig. 11. Fig. 13 is a detail plan view of magnets 21, armature to same, &c. Fig. 14 is a detail plan view of plate 27 and means for short-circuiting. Fig. 15 is a detail view of armature to magnet 29 and attachments, contact-plate 36, and electric connections. Fig. 16 is a cross-section through one of bows of globe-holder. Fig. 17 is a section through lower part of shaft 8, showing middle disk and attached hook. Fig. 18 is a diagrammatic view illustrating the circuits.

This invention has relation to arc electric lamps, and is designed to provide a self-trimming magazine-lamp wherein a large number of carbons may be successively fed into operation automatically, the lower or negative carbon being released and dropped out when the positive carbon has been fed and burned to a certain point, said positive carbon being at the same time released and dropped into the negative holder, where it is caught and held, while a new carbon is fed from the magazine into the positive holder, this action being repeated while the lamp is in operation until all the carbons are exhausted from the magazine.

The invention is also designed to obviate the use of the feed-rod commonly employed, the carbons being held and fed directly by means of automatic clutches of simple character, operating by gravity and controlled by the current, the feeding devices being of such character as to insure a steady light.

Other objects of the invention will hereinafter appear.

With these objects in view the invention consists in the novel construction and combination of parts, all as hereinafter described, and pointed out in the appended claims.

Referring to the accompanying drawings, the numeral 1 designates the frame of the lamp, at the upper portion of which the carbon-magazine is supported. Said magazine is shown as consisting of an upper hollow inverted cone 2 and a second and similarly-placed lower cone 3. The cone 2 is formed with a central opening 4 in its bottom, from which radiate a series of slots 5, which extend to the rim portion 6, and are of the proper width to receive the carbons in vertical position. The lower cone 3 is formed with a series of radial troughs or channels 7, which correspond in number and position to the slots 5, being designed to receive therein the lower ends of the carbons.

8 is a central rotary shaft whose lower end has a bearing on the central bottom portion of the cone 3, and its upper portion in an arm 9 of the frame. The lower portion of said shaft is hollow, with a vertical opening or slot 10 in one side of the proper character to receive a carbon. Formed on or secured to the said hollow portion are two disks 11, each of which has a slot 12 opposite to and corresponding with the slot 10. Secured to each disk and extending across in front of the slot 12, but at some distance therefrom, is a hook 13.

14 is a third disk which is suspended from the arm 9 and forms a bearing for the upper ends of the carbons. Placed in each of the slots 5 is a gravity-roller 15, which is designed to travel behind the last carbon in said slot as it feeds toward the center to assist the feed and to prevent the carbon falling outwardly. The edges of the slots 5 are formed with notched ribs or flanges 16 upon which the axes of the said rollers travel, each of the notches having a vertical shoulder 17, which prevents the roller from moving backwardly under the action of the wind swaying the lamp or from other causes.

Where each of the troughs or channels 7 runs into the central gravity-passage of the cone 3 there is placed a small lug $17^a$, which is hinged at $17^b$, and is normally held by a spring $17^c$ in such position that its upper end forms a stop for the carbon. On the lower disk 11 is a projection $11^a$, designed to engage with the said lugs successively to depress them to permit the carbon to slide into the feed-tube, as hereinafter described. The purpose of these devices is to relieve the lower disk 11 from the friction of the carbons, which would otherwise press against it.

The upper end portion of the shaft 8 is formed with a spiral thread 18, engaged by a nut 19, which turns loosely in an armature 20 of electromagnets 21, supported on the arm 9. Said armature is prevented from rotation by means of notches 22 in its ends, which engage posts 23 on the magnets. Seated around said posts and bearing against the under side of the armature are springs 24, which act to recover the armature. The nut 19 has a ratchet-and-pawl device 25, which permits the nut to turn freely on the shaft as the armature is recovered, but which holds said nut to the armature during the attraction of the armature toward the magnet, whereby the said shaft will be rotated.

26 designates a feed-tube which is secured in the bottom of the cone 3 and which supports a plate 27, through which the tube extends.

28 28 designate the resistance-magnets, which are shown as supported underneath the plate 27.

29 is a magnet whose coil is in a shunt of the main or lamp circuit. 30 is the armature of the said magnet, which is suspended by a spring resistance-coil 31, attached at its upper end to an adjusting-screw 32, which is seated in and insulated from the plate 27.

$32^a$ is a lower plate, which is connected with the plate 27 by the two oppositely-placed hollow posts 33. Attached to the armature 30 is a lever 34, which is also pivoted to a lug 35, secured to and insulated from one of the posts 33. The upper arm of said lever normally rests against a contact-plate 36, which is also secured to and insulated from the post 33.

37 designates the holder and clamp for the upper or positive carbon, which consists of a vertically-movable tube whose upper end is a short distance below the lower end of the feed-tube 26. The lower end of said tube, when in its lowest position, is designed to rest upon perforated cap-plate 38, which is secured to a sleeve $38^a$, which depends from the under side of the lower plate 32. The lower end of the said tube is formed with a squared portion 38, to opposite lateral faces of which are pivoted lever dogs or clutches 39, whose inner arms extend into the tube through slots 40 and are shaped to partially embrace or grip the carbon. Attached to the outer arms of the respective lever dogs or clutches are rods 41, whose upper ends are secured to the armature 42 of the magnets 28, said armature being free to slide vertically on the said tube. When the said magnets are in action and the armature is attracted thereto, the tube is raised and the dogs or clutches are thrown into position to grip the carbon. When, however, the armature is released, as hereinafter described, the tube drops onto the cap and the dogs are thrown out of gripping relation to the carbon by reason of the downthrust of the rods 41, due to the dropping of the armature.

The lower-carbon holder consists of an upper short tube portion 43, which is carried by a box 44, a lower tube portion 46, and the clamps 47 and 48. The clamp 47 consists of two lever-dogs whose outer arms are pivoted to the lateral walls of the box 44 at the points 49 and whose inner arms extend into the portion 46 through the slots 50 and are shaped to grip a carbon. The part 46, it will be observed, is suspended within the box 44 by means of these lever-dogs. (See Figs. 6, 7, and 8.)

In Figs. 9 and 10 I have shown a slightly-different form of these dogs, wherein they are each pivoted to the box 44 near their outer ends and upon the opposite side of the part 46 to that in which is the slot 50, through which their gripping ends enter. Attached to the part 46 is a yoke 52, whose lower transverse arm constitutes an armature $52^a$ for a pair of electromagnets 53, which are supported within the yoke but independently thereof.

48 are two clamps or clutches, before referred to, which are pivoted to opposite sides of the part 46 and whose lower arms 54 are arranged to swing below the lower end of 46 and are shaped to the carbon.

55 are dogs pivoted to the upper arm of the yoke 52, one behind each of the clutches, their purpose being to limit the outward swing of the clutches 48 at the proper times and to hold the arms 54 underneath the orifice of the tube portion 46. These dogs 55 normally hang in such position that the clutches 48 are free to swing outward and away from underneath 46, and they are forced into locking position by means of pins 56, with which they engage as the yoke is drawn upwardly, as more fully hereinafter described. In order to hold the said clutches 47 in this outward position, each is provided at the upper end of one or both of its vertical arms above the pivot with a hook portion 57, which normally engages a pin 58 of the box 44. The weight of the yoke and armature causes the engagement of this hook and pin to throw the said clutches outwardly, as will be readily understood. (See Fig. 6.)

59 is the positive terminal of the feed or supply wire which is connected to a binding-post 60 on the plate 27. From this binding-post the current passes by the connection 61 to a lever 62 of an automatic switch or cut-out device. Said lever is pivoted at 63 to the sleeve $38^a$ before described. The lower arm of said lever is held in contact with the upper arm of a second lever 64 by means of a spring $60^a$ of slight tension. The lever 64 is pivoted to sleeve $38^a$ at the point 66, and its lower arm has an inward stud or projection 67, which enters the tube 37 through a slot in said tube and contacts with the upper carbon A.

68 is a stationary contact with which the upper arm of the lever 62 is designed to engage, but with which it is normally out of engagement, being held in this position, as will be readily seen, by the contact of the stud 67 with the carbon A. When, however, the upper end of said carbon is fed below the said stud, the latter moves farther into the tube by the gravity of the lever 64, which throws the upper arm of the lever 62 into contact with 68. This cut-out device usually exists in duplicate upon both sides of the sleeve $38^a$, the two devices being electrically connected. The current normally passes by the connection 61 to the lever 62, thence to lever 64 and to the carbon A, thence to the lower carbon B, and from thence by wire 69 to the coils of the magnets 28. From the magnets 28 it passes by connection 70 to the contact-plate 36, thence through lever 34 and connection to the main binding-post 72, to which is attached the negative terminal of the feed-wire, thus completing the main or lamp circuit.

73 is the shunt in which is located the magnet 29.

74 is a connection from the wire 69 to the resistance-coil 31.

75 is the connection from the stationary contact 68 to the coils of magnets 53. 76 is a connection from the said magnets to the magnets 21.

77 is the return-wire from the magnets 21 to the main negative binding-post 72.

78 is a hand-switch for cutting the lamp out of circuit.

79 is an automatic cut-out for shunting the lamp should it become inoperative. This cut-out will be more fully described after the general operation of the lamp has been explained.

Starting with the first pair of carbons properly trimmed and the lamp burning, the operation is described as follows: As the carbons burn away the resistance through the main circuit including the magnets 28 becomes greater, causing a stronger current to flow through the coil of the shunted magnet 29 until said magnet becomes strong enough to attract its armature 30. This armature being attracted against the tension of the spring 31 the lever 34 is rocked on its pivot out of contact with the plate 36, thereby cutting the magnets 28 completely out of circuit. The return-circuit from the lower carbon is now made through the connection 74, resistance-coil 31, lever 34, and connection 71, to binding-post 72. When the magnets 28 are cut out, the armature 42 drops slightly, carrying with it the tube 37, until the latter is stopped by the cap-plate 38. This movement through the rods 41 rocks the dogs or clutches 39 away from the carbon, which feeds down by gravity, restoring the main circuit to normal condition and restoring back thereto the current which was momentarily diverted into the coil of the shunt-magnet 29. The armature 30 is now released from the magnet 29, which restores the contact between the lever 34 and plate 36 and throws the magnets 28 back into circuit. The armature 42 is now attracted, raising the tube 37 slightly and setting the clutches 39 upon the carbon. The actions just described are in practice momentary in character and the actual movement of the armature 42 is very slight, being simply a vibration, which results in a regular feed and a steady light. This action is continued until the upper carbon has been fed down to a point where its upper end passes the stud 67, when the lever 64 swings as above described, to operate lever 62 to make contact with the plate 68. This done the current passes to magnets 53, which are energized, and the armature $52^a$ is attracted. This raises the yoke 52, which rocks the clamp-dogs 47 to release their grip on the lower carbon, which drops out and onto the ground. As the yoke rises the hook portions 57 of the clamps 48 are released from the pins 58, and as soon as the lower carbon has fallen out said clamps swing into position underneath the part 46 to catch the upper carbon when it descends. At the same time the dogs 55 are, by engagement with the pins 56, forced behind the clamps 48 to lock them in such position. The main or lamp circuit being now broken, the current is thrown into the magnet 29 and the same action follows as was described in connection with the feeding of the upper carbon, the clamps 39 remaining open to permit said carbon to fall out of the upper holder and drop into the lower one, when it is caught and held by the clamps 48. At the same time the magnets 53 are energized the upper magnets 21 are also energized and attract the armature 20, which rotates the shaft 8, causing the hooks 13 to engage a carbon and draw it into the hollow portion of the said shaft. This is done in the following manner: The lug $17^a$ being depressed by projection $11^a$, the lower end of the carbon readily slides into the upper end of the feed-tube 26, down which it commences to slide until the upper end of said carbon falls through the slot of the upper disk 13 into the hollow portion of said shaft. The carbon now slides down the tube 26 into the tube 37 until its lower end strikes the stud 67 and forces it outward, actuating levers 62 and 64 to cut off the current from the magnets 53 and 21. As soon as the magnets 53 are cut out the armature $52^a$ and yoke 52 drop, which causes the clutches 47 to grip the lower carbon, the dogs 55 to be released, and the clutches 48 to swing back. At the same time the armature 20 is recovered by its springs, the nut 19 turning freely on the shaft 8. The inner end of the stud 67 is beveled off in order that it will be readily forced outward by the contact of the descending carbon therewith. The upper carbon continues to descend until the circuit is again established through the carbons and the magnets 28 put into circuit in the manner above described. The armature 42 is now attracted and the clutches 39 caused to grip said upper carbon. This operation is repeated, one carbon being taken successively from each of the holders in the magazine during each revolution of the shaft 8.

The automatic cut-out 79 consists of a contact-arm secured to and insulated from the post 33 in such position that when the armature 30 is attracted the upper arm of the lever 34 will contact therewith and, by means of a connection 80 to the post 60, short-circuit the lamp, the current from the positive binding-post passing to contact 79, thence to lever 34, and thence to post 72. When, therefore, the lamp becomes inoperative by reason of the failure of the feeding mechanism to operate or from other causes, the increased resistance in the main circuit causes the magnet 29 to be energized, its armature 30 is attracted, and the lamp is shunted.

The adjustable screw to which is attached the coil-spring 31 forms a means for regulating the candle-power of the lamp, since by adjusting this screw to increase the tension of the spring or diminish it a corresponding increase or decrease of current in the coil of magnet 29 will be necessary to attract said armature. The feed will therefore take place at longer or shorter intervals and the length of the arc varied.

81 designates the globe-holder, the bows of which are formed at their upper ends with vertical extensions 82, which extend into the hollow posts 33 and are formed each with a groove or keyway 83. 84 are set-screws which engage the said grooves and by means of which the holder is secured. By loosening these screws the holder can be lowered for the insertion or removal of the globe. Said bows are grooved, as indicated at $84^a$, to form seats for the circuit-wires to the magnets 53 and for the return-wires for the lower-carbon holder to the magnets 28.

85 is a casing which protects the magnets 28 and the adjacent mechanism. A suitable hood (not shown) will also be placed over the magazine and the upper portion of the lamp.

It will be observed that inasmuch as the magnets 28 are entirely cut out of the circuit at the time the feed is made the feeding devices are sure to operate properly.

It will be observed, further, that in a lamp of this character there is a great saving of carbon, since when the positive carbon has been burned to the full extent possible is takes the place of the lower carbon as it it again burned until but a short piece remains and is dropped out.

The lamp as above described is designed for use with a direct current.

I do not wish to limit myself to the employment of the particular mechanism which I have shown and described, since this may be varied without departing from the spirit and scope of my invention.

Having thus described my invention, what I claim as new, and desire to secure by Letters Patent, is—

1. In an electric lamp, the combination with the upper and lower carbon holders, and with a magazine designed to contain a number of upper carbons, of mechanism for successively and automatically feeding the carbons from the magazine into the upper holder, and for releasing at the proper times the upper and lower carbons, whereby the lower carbon is permitted to fall away from the lamp and the partially-burned upper carbon is caused to drop into the lower holder, together with means whereby said partially-burned upper carbon is caught in the lower holder and becomes the lower carbon, substantially as specified.

2. In an electric lamp, the combination with a magazine designed to contain a plurality of carbons, and with positive and negative carbon holders or clamps, of means for releasing automatically the carbons from both the said holders when the positive carbon has been burned to a predetermined point, and means for automatically feeding into the positive holder a carbon from the magazine when said positive carbon is released, and for causing the lower holder to receive and retain the partially-burned carbon which is released from the upper holder, substantially as specified.

3. In an electric lamp, the combination of a lower-carbon holder having gravity-actuated and electrically-controlled clamps, an upper-carbon holder consisting of a tube through which the carbon is fed by its own gravity, said tube having clamps of similar character to those of the lower holder, electromagnetic devices for releasing said clamps, at the proper times, a magazine-holder designed to contain a plurality of carbons, and electrically-operated mechanism for feeding one carbon at a time from the said magazine into the upper-carbon holder, substantially as specified.

4. An arc electric lamp having a magazine designed to contain a plurality of carbons, mechanism for automatically feeding said carbons successively into the upper-carbon holder of the lamp, and mechanism whereby when the upper carbon becomes burned to a predetermined point, the lower carbon is automatically released and drops from the lamp, and the upper carbon falls and takes the place of the lower carbon, together with means in connection with said lower holder for catching and retaining the partially-burned upper carbon therein, substantially as specified.

5. In an arc electric light, the combination of a magazine-holder for upper carbons, an upper-carbon holder capable of a limited vertical movement and designed to permit a gravity feed of the carbon therethrough, clamps carried by said holder and arranged to grip the carbon when said tube is raised, and to release it as it is lowered, a lower-carbon holder, its gravity-actuated clamps, electromagnetic devices for controlling the movements of said upper holder and for releasing the clamps of the lower holder, a rotary feeding device arranged to feed one carbon at a time from the magazine into the said upper-carbon holder, electromagnets for operating said feeding device and automatic switches, whereby when the upper carbon has burned to a predetermined point said switches are moved to throw into operation the clamp-releasing and carbon-feeding devices, substantially as specified.

6. In an electric lamp, the combination of a magazine designed to contain a plurality of carbons, a gravity-feed positive-carbon holder below the magazine, feeding mechanism for feeding one carbon at a time from the magazine into said holder, electromagnet and armature mechanism for actuating the feeding mechanism, a lower or negative carbon holder, electromagnetic devices for automatically feeding the positive carbon toward the lower one, and for controlling the operation of the positive and negative holders, electric connections, and a switch operated by the positive carbon and arranged when said carbon has burned to a certain point to throw into circuit the magnets of the devices which control the carbon-holders and the feeding mechanism from the magazine, whereby the negative carbon is released and falls from its holder, the positive carbon is released and caught by the negative holder, and a new carbon is fed from the magazine and is caught in the positive holder, substantially as specified.

7. In a magazine arc-lamp, a magazine designed to contain a plurality of carbons, and consisting of an upper, hollow, inverted cone, having therein a series of radial slots and a lower cone also hollow and inverted, and having a series of radial channels which correspond to the slots in the upper cone, together with a feed device arranged centrally of the said magazine and designed to take one carbon at a time therefrom, substantially as specified.

8. In an arc electric lamp, a magazine consisting of an upper, hollow inverted cone having a series of radial slots therein, a lower cone, also hollow and inverted, and having a series of radial channels or troughs which correspond to the slots of the upper cone, and gravity-rollers arranged to run in the said slots, together with mechanism arranged centrally of the said cones and designed to take one carbon at a time therefrom and feed it to the lamps, substantially as specified.

9. In an arc electric lamp, the magazine having an upper, hollow, inverted cone formed with a series of radial slots, and a lower cone also hollow and inverted and formed with radial channels which correspond to the said slots, said lower cone having also a central depression in its bottom, a feed-tube communicating with the center of said depression, a rotary, vertical shaft having a bearing in said depression, and hollow for a portion of its length, said hollow portion being open at one side, the slotted disks carried by said hollow portion and having hooks, and pivoted lugs arranged in said depression opposite the lower ends of the radial channels, all substantially as and for the purpose described.

10. In an arc electric lamp, the combination with a magazine arranged to support a plurality of carbons in vertical position, of a rotary shaft arranged centrally of the magazine and hollow for a portion of its length, said hollow portion being open at one side, disks carried by said hollow portion and formed each with a radial slot in alinement with said open side, a hook device carried by each of said disks adjacent to said slot, and a feed-tube secured in the bottom of the magazine and having its opening in alinement with the said shaft, together with means for automatically rotating said shaft by a step-by-step movement at the proper times, substantially as specified.

11. In an arc electric lamp, the combination with a magazine arranged to support a plurality of carbons in radial series around its center and to feed them toward its center by gravity, of a rotary, vertical shaft arranged centrally of the said magazine and having a hollow portion which communicates with a feed-passage to the lamp below, said hollow portion being open at one side, means on said shaft whereby one carbon at a time is taken from the magazine into the said hollow portion, and means for automatically imparting a step-by-step rotation to the said shaft at the proper times, substantially as specified.

12. In an arc electric lamp, the combination with a magazine arranged to support a plurality of carbons therein, of a rotary shaft arranged centrally of the said magazine and having a hollow portion, and means for taking one carbon at a time from the said magazine into said hollow portion, said shaft having also a threaded portion, a nut engaging said threaded portion, electromagnets, an armature therefor carried loosely by said nut, means for preventing the rotation of said armature, means for locking the nut to the armature as the latter is attracted to the magnet and for permitting the nut to rotate on said shaft during the recovery of the armature, and means for recovering the armature, together with means for temporarily energizing the magnets at the proper times, substantially as specified.

13. In an arc electric lamp, the combination with the main lamp-circuit including the carbons and carbon-holders, and inverted electromagnets, of an electromagnet located in a shunt of the main circuit, a spring-supported armature, a cut-out for said inverted magnets operated by the said armature, an armature for said inverted magnets, and a mechanical connection between the said armature and the clamps of the upper-carbon holder, substantially as specified.

14. In an arc electric lamp, the combination with the magazine and the electromagnetically-operated devices for feeding automatically one carbon therefrom at a time to the lamp, of the vertically-movable tube placed below the magazine and in line with the delivery thereof, the inverted magnets, the armature thereof arranged to slide upon said tube, the pivoted carbon-clamps carried by said tube, and connected with the said armature, and means for automatically cutting said magnets out of the circuit to release the said armature and actuate said clamps, whenever the resistance in the main circuit is increased to a predetermined degree, substantially as specified.

15. In an arc electric lamp, the combination of the inverted magnets 28 having their coils in the main circuit, the shunted magnet 29, its armature 30, the adjustable spring 31 which supports said armature and which forms a resistance-coil, the switch operated by said armature for cutting the magnets 28 out of circuit, an electrical connection between the said spring and the leading-in wire of the said magnets, and between said switch and the main negative binding-post of the lamp, substantially as specified.

16. In an arc electric lamp, the upper-carbon holder consisting of a vertical tube, clutches pivoted thereto and arranged to grip the carbon, an armature mounted to slide vertically on the said tube, mechanical connections between said clutches and the said armature, and electromagnets for controlling said armature, substantially as specified.

17. In an arc electric lamp, the combination with the magnets 28 having their coils in the main lamp-circuit of the magnet 29 whose coil is in a shunt of the said circuit, the armature 30, its supporting-spring 31, which forms a resistance-coil, the lever 34 attached to said magnet and pivoted to and insulated from the lamp-frame, the said lever having a contact portion, a contact-plate normally in contact with said lever, and electrical connections whereby as the said armature is attracted the magnets 28 are cut out of the main circuit, substantially as specified.

18. In an arc electric lamp, the combination of the magnets 28 whose coils are in the main circuit, the shunted magnet 29, the armature 30, its supported and resistance spring 31, the lever 34 attached to said armature and pivoted to the frame, the contact-plate 36 normally impinged by said lever, and the contact 79, arranged to be impinged by said lever when the said armature is attached to its magnet 29, together with the necessary electrical connections, substantially as specified.

19. In an arc electric lamp, the combination of the vertically-movable feed-tube 37, the clamps or clutches 39 pivoted thereto, means for limiting the movement of said tube, the armature arranged to move vertically on the said tube, the rods connecting said armature with arms of the said clamps or clutches, and electromagnet and switch devices for controlling the said armature, substantially as specified.

20. The combination with the upper and lower carbon holders, their clutches or clamps, and the electromagnetic devices for releasing said clutches or clamps, of the lever pivoted to the upper-carbon holder and having a gravity-arm which normally makes contact with the upper carbon, said lever forming part of the main or lamp circuit, a contact-piece electrically connected with the magnets which control the mechanism for releasing the clutches of the lower holder, means whereby at the same time the clutches or clamps of the upper holder are released, to permit the upper carbon to drop into the lower holder means whereby said carbon is caught and held by the said lower holder, a magazine containing a plurality of upper carbons, and means operated automatically by the action of said lever for feeding a single carbon at a time from said magazine into the upper holder, substantially as specified.

21. In an arc electric light, the lower-carbon holder, having clutches adapted to hold the carbon and normally held in action by the gravity of the holder, an armature suspended from said holder, electromagnets which control said armature, and means for holding a new carbon in said holder after the first has been released and before the clutches are brought back to operative position, substantially as specified.

22. In an arc electric light, a lower-carbon holder which retains the carbon by the action of its own gravity, an armature suspended from said holder, and a magnet or magnets for raising said armature and holder, together with means for energizing said magnet or magnets at the proper time, substantially as specified.

23. In an arc electric light, a lower-carbon holder, comprising a holder proper, as the part 46, pivoted clutch-dogs 47, which are normally held in contact with the carbon by the gravity of the holder, an armature suspended from said holder, electromagnets for raising said armature and holder, the pivoted clamps 48 normally out of operation, and means whereby as said holder is raised, said clamps are thrown into operative position, substantially as specified.

24. In an arc electric light, a lower-carbon holder, consisting of a stationary portion, as the part 44, the holder proper suspended therein, the clutch-dogs 47 normally held in operative position by the gravity of said holder, an armature connected to said holder and suspended therefrom, electromagnets for raising said armature and thereby the holder to release said dogs, the pivoted clamps 48 and means whereby said clamps are thrown into operation when the dogs are released, and are released when the dogs are again brought into operation, substantially as specified.

25. In an arc electric light, a lower-carbon holder consisting of a stationary portion, as 44, having a tube 43, the part 46 suspended in said stationary portion, the clutch-dogs 47 the yoke connected to said part 46 and suspended therefrom, the armature carried by said yoke, the magnets above said armature, the swinging clamps 48, the dogs 55, and means for operating said clamps and dogs, all substantially as and for the purpose specified.

26. The herein-described magazine arc electric lamp, comprising upper and lower carbon holders, means for feeding the upper carbon as it burns, means whereby when said upper carbon has burned to a certain point, both the carbons are released from their holders, and the upper carbon drops to become the lower one, a magazine containing a plurality of upper carbons, and mechanism operated automatically to feed one carbon from said magazine into the upper holder as the preceding carbon is released therefrom, substantially as specified.

27. The herein-described magazine arc electric lamp, comprising essentially a magazine arranged to support a plurality of upper carbons in vertical position and in radial series, a rotary device arranged centrally of the said series and arranged to take and receive one carbon at a time from the said magazine, electromagnetically-operated mechanism for operating said device, upper and lower carbon holders having clutches or clamps, a gravity-feed passage from said rotary device to the upper-carbon holder, means for feeding the upper carbon as it burns, electromagnetic devices for releasing the said clutches or clamps, a switch operated by the upper carbon and arranged to automatically throw the current into and out of the coils of said electromagnetic mechanism and devices, and means in the lower-carbon holder for catching the upper carbon as it falls therein from the upper carbon after the lower carbon has been released and dropped, substantially as specified.

In testimony whereof I affix my signature in presence of two witnesses.

ALVIE O. MACKIN.

Witnesses:
JOHN E. WILEY,
JUNE JOHNSON.